United States Patent
Kunimoto

(10) Patent No.: US 9,340,652 B2
(45) Date of Patent: May 17, 2016

(54) TRANSPARENT FILM

(71) Applicant: Polyplastics Co., Ltd., Tokyo (JP)

(72) Inventor: Eiki Kunimoto, Fuji (JP)

(73) Assignee: POLYPLASTICS CO., LTD., Tokyo (JP)

( * ) Notice: Subject to any disclaimer, the term of this patent is extended or adjusted under 35 U.S.C. 154(b) by 0 days.

(21) Appl. No.: 14/423,893

(22) PCT Filed: May 24, 2013

(86) PCT No.: PCT/JP2013/064471
§ 371 (c)(1),
(2) Date: Feb. 25, 2015

(87) PCT Pub. No.: WO2014/034200
PCT Pub. Date: Mar. 6, 2014

(65) Prior Publication Data
US 2015/0259485 A1    Sep. 17, 2015

(30) Foreign Application Priority Data

Aug. 31, 2012 (JP) ................................. 2012-191923

(51) Int. Cl.
*C08J 5/18* (2006.01)
*C08L 45/00* (2006.01)
*C08L 35/06* (2006.01)

(52) U.S. Cl.
CPC .. *C08J 5/18* (2013.01); *C08L 35/06* (2013.01); *C08L 45/00* (2013.01); *C08J 2300/00* (2013.01)

(58) Field of Classification Search
CPC ........... C08L 9/06; C08L 25/10; C08L 23/00; C08L 23/02; C08L 23/18; C08L 45/00; C08J 5/18
See application file for complete search history.

(56) References Cited

U.S. PATENT DOCUMENTS

| | | | | |
|---|---|---|---|---|
| 5,468,803 A | * | 11/1995 | Takahashi | A61L 29/06 524/551 |
| 6,090,888 A | * | 7/2000 | Khanarian | C08L 45/00 525/210 |
| 6,331,591 B1 | | 12/2001 | Miyamoto et al. | |
| 7,365,130 B2 | * | 4/2008 | Rivett | C08L 23/0823 525/191 |
| 2006/0036033 A1 | | 2/2006 | Toyoshima et al. | |

FOREIGN PATENT DOCUMENTS

| | | |
|---|---|---|
| CN | 1703459 A | 11/2005 |
| CN | 101501127 A | 8/2009 |
| EP | 1548063 A1 | 6/2005 |
| JP | H10-95881 | 4/1998 |
| JP | H11-21413 | 1/1999 |
| JP | 2001-302889 | 10/2001 |
| JP | 2004-156048 | 6/2004 |
| JP | 2005-113026 | 4/2005 |
| JP | 2007-154074 | 6/2007 |
| KR | 10-2005-0073464 A | 7/2005 |
| TW | 418234 B | 1/2001 |
| WO | WO 2004/035688 A1 | 4/2004 |
| WO | WO 2008/018952 A1 | 2/2008 |

OTHER PUBLICATIONS

Office Action dated Sep. 25, 2015 in Chinese Patent Application No. 201380044657.1

* cited by examiner

*Primary Examiner* — Irina S Zemel
*Assistant Examiner* — Jeffrey Lenihan
(74) *Attorney, Agent, or Firm* — Knobbe Martens Olson & Bear LLP

(57) ABSTRACT

A cyclic olefin resin film which has heat resistance and improved brittleness. A heat-resistant transparent film which has an internal haze value of 1.0% or less and contains a cyclic olefin resin having a refractive index of n1 and a glass transition temperature (Tg) of 170° C. or more and a styrene elastomer that has a refractive index of n2 so that $\Delta n=|n2-n1|$ is 0.012 or less. The heat-resistant transparent film may contain two or more kinds of styrene elastomers, and the cyclic olefin resin may be a copolymer of norbornene and ethylene.

1 Claim, 1 Drawing Sheet

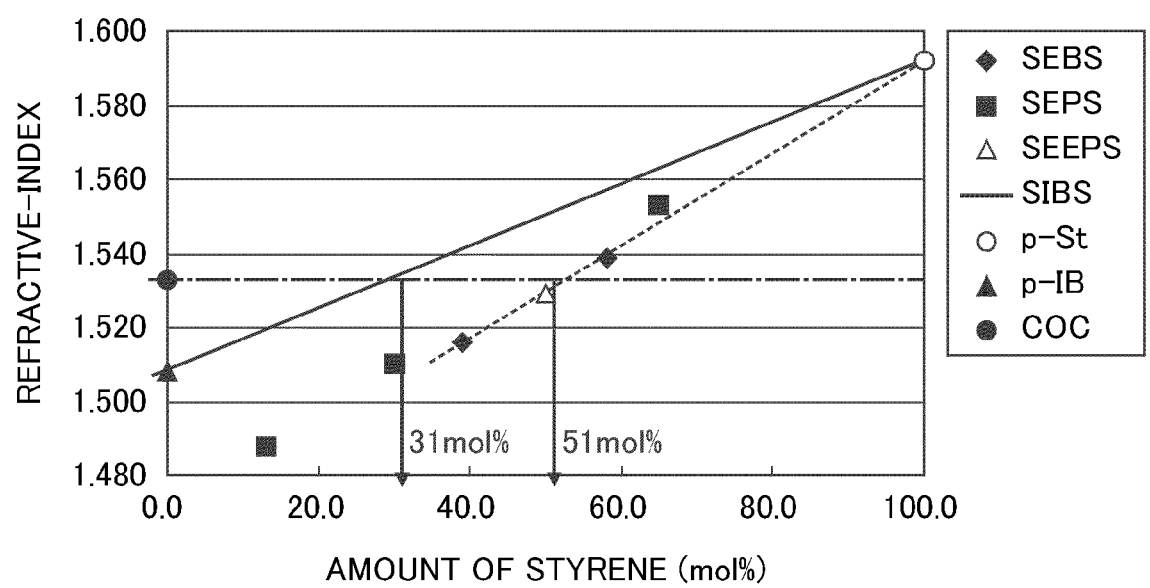

TRANSPARENT FILM

This application is the U.S. National Phase under 35 U.S.C. §371 of International Application PCT/JP2013/064471, filed May 24, 2013, designating the U.S., and published in Japanese as WO 2014/034200 on Mar. 6, 2014, which claims priority to Japanese Patent Application No. 2012-191923, filed Aug. 31, 2012, the entire contents of which are incorporated herein by reference.

TECHNICAL FIELD

The present invention relates to a transparent film mainly containing a cyclic olefin resin.

BACKGROUND ART

A cyclic olefin resin has a backbone of cyclic olefin as a main chain. It is a resin having many characteristics such as high transparency, low birefringence, high heat deformation temperature, lightweightness, dimensional stability, low water absorptivity, hydrolysis resistance, chemical resistance, low dielectric constant, low dielectric loss and being free of environmentally hazardous substances. For this reason, a cyclic olefin resin is used for a wide variety of fields in which these characteristics are required.

Although a cyclic olefin resin has many superior characteristics as described above, physical properties thereof may need to be improved in certain cases. One of the issues required to be improved is to satisfy both transparency and impact resistance. Improved methods are disclosed in which for an injection molded article and a press molded test piece intended for use in containers, a cyclic olefin resin is used together with a styrene based elastomer, and the difference in the refractive index is adjusted (see Patent Documents 1 and 2).

Patent Document 1: Japanese Unexamined Patent Application, Publication No. H10-95881

Patent Document 2: Japanese Unexamined Patent Application, Publication No. H11-21413

DISCLOSURE OF THE INVENTION

Problems to be Solved by the Invention

The compositions according to Patent Documents 1 and 2 are each intended for a container. However, in recent years, a cyclic olefin resin has gathered attentions for its use as an optical film member for a display and the like. In this case, further, higher durability is more often required, assuming use under severe environments. For example, in the case of members used under high temperature environments such as monitoring instruments inside an automobile in summer and under high temperature work environments, there is a request to confer thermal resistance. However, in a case where the glass transition point (Tg) of a cyclic olefin resin is increased in order to confer thermal resistance, a film becomes fragile, causing new problems of a crack upon folding and dust generation upon cutting. These can be fatal flaws for an optical film member.

The present invention is made in order to solve the above problems. An object of the present invention is to confer thermal resistance on a film mainly comprising a cyclic olefin resin, and also is to provide a film in which brittleness is improved while transparency is maintained.

Means for Solving the Problems

The present inventors conducted extensive studies in order to solve the above problems. As a result, the present inventors find that the above problems can be solved even for a transparent film comprising a cyclic olefin resin having a high Tg which can confer thermal resistance and a styrene based elastomer in which the styrene based elastomer which forms a micro domain is under drawing force by adjusting the amount of styrene in the styrene based elastomer to adjust its refractive index to the extent similar to that of the cyclic olefin resin. Then the present invention is completed. More specifically, the present invention provides the followings.

(1) A transparent film, comprising a cyclic olefin resin having a refractive index of n1 and a glass transition point (Tg) of 170° C. or more, and at least one styrene based elastomer having a refractive index of n2 so that $\Delta n = |n2-n1|$ is 0.012 or less, wherein an internal haze value of a test piece having a thickness of 100 μm is 1.0% or less as measured in a PEG (polyethylene glycol) liquid in accordance with JIS K7136.

(2) The transparent film according to (1), comprising two or more styrene based elastomers as said at least one styrene based elastomer.

(3) The transparent film according to (1) or (2), comprising at least said at least one styrene based elastomer having a melt index (MI) smaller than that of the cyclic olefin resin at 270° C. and at a load of 2.16 kg.

(4) The transparent film according to (3), further comprising said at least one styrene based elastomer having an MI larger than that of the cyclic olefin resin.

(5) The transparent film according to any one of (1) to (4), wherein the cyclic olefin resin is a copolymer of norbornene and ethylene.

(6) The transparent film according to any one of (1) to (5), wherein the difference in haze values before and after a 1-hour treatment at 150° C. in accordance with JIS-K7136 is 0.3% or less for a test piece having a thickness of 100 μm.

Effects of the Invention

According to the present invention, thermal resistance can be conferred on a film mainly comprising a cyclic olefin resin, and a film can be provided in which brittleness is improved while transparency is maintained.

BRIEF DESCRIPTION OF THE DRAWINGS

The FIGURE shows a relation between the amount of styrene in a styrene based elastomer and the refractive index.

PREFERRED MODE FOR CARRYING OUT THE INVENTION

Below, embodiments of the present invention will be described. Note that the present invention shall not be limited to the following embodiments.

[Cyclic Olefin Resin Composition]

A cyclic olefin resin composition comprises a cyclic olefin resin and a styrene based elastomer. Below, a cyclic olefin resin, a styrene based elastomer and other components will be described.

Cyclic Olefin Resin

There is no particular limitation for cyclic olefin resins as long as they comprise a cyclic olefin component as a copolymerization component, and have a glass transition point (Tg) of 170° C. or more, and are polyolefin based resins comprising a cyclic olefin component in the main chain thereof. For example, they can include an addition copolymer of cyclic olefin or a hydrogenated product thereof, an addition copolymer of cyclic olefin and α-olefin or a hydrogenated product thereof and the like.

Further, cyclic olefin resins include those in which the above polymer is further grafted and/or copolymerized with an unsaturated compound having a polar group.

Polar groups can include, for example, a carboxyl group, an acid anhydride group, an epoxy group, an amide group, an ester group, a hydroxyl group. Unsaturated compounds having a polar group can include (meth)acrylic acid, maleic acid, maleic anhydride, itaconic acid anhydride, glycidyl(meta) acrylate, (meth)acrylic acid alkyl (a carbon number of 1 to 10) ester, maleic acid alkyl (a carbon number of 1 to 10) ester, (meth)acrylamide, (meth)acrylic acid-2-hydroxyethyl and the like.

A cyclic olefin resin is preferably an addition copolymer of cyclic olefin and α-olefin or a hydrogenated product thereof.

Further, it is also possible to use a commercially available resin as a cyclic olefin resin comprising a cyclic olefin component as a copolymerization component used in the present invention. Commercially available cyclic olefin resins can include, for example, TOPAS® (Topas Advanced Polymers), APEL® (Mitsui Chemicals, Inc.), ZEONEX® (Zeon Corporation), ZEONOR® (Zeon Corporation), ARTON® (JSR Corporation) and the like. Among these, cyclic olefin resins having a glass transition point (Tg) of 170° C. or more can include TOPAS 6017S-04 and the like.

Particularly preferred examples of an addition copolymer of cyclic olefin and α-olefin can include a copolymer comprising [1] an α-olefin component having a carbon number of 2 to 20 and [2] a cyclic olefin component represented by the following general formula (I).

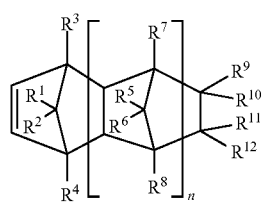

(I)

(wherein each of $R^1$ to $R^{12}$ may be the same or different, and is selected from the group consisting of a hydrogen atom, a halogen atom and a hydrocarbon group, and $R^9$ and $R^{10}$, $R^{11}$ and $R^{12}$ may together form a divalent hydrocarbon group, $R^9$ or $R^{10}$ and $R^{11}$ or $R^{12}$ may together form a ring.

Further, n represents 0 or a positive integer,

When n is 2 or larger, $R^5$ to $R^8$ each may be the same or different in a repeating unit thereof.)

[[1] α-Olefin Component Having a Carbon Number of 2 to 20]

There is no particular limitation for α-olefin components having a carbon number of 2 to 20. For example, they can include those similar to Japanese Patent Application Laid-Open No. 2007-302722. Further, these α-olefin components may be used alone, or two or more of these may be used simultaneously. Among these, use of ethylene alone is most preferred.

[[2] Cyclic Olefin Component Represented by the General Formula (I)]

Each of $R^1$ to $R^{12}$ in the general formula (I) may be the same or different, and is selected from the group consisting of a hydrogen atom, a halogen atom and a hydrocarbon group.

Specific examples of $R^1$ to $R^8$ can include, for example, a hydrogen atom; a halogen atom such as fluorine, chlorine and bromine; a lower alkyl group such as a methyl group, an ethyl group, a propyl group and a butyl group; and the like. These may be each different or partially different, or all may be the same.

Further, specific examples of $R^9$ to $R^{12}$ can include, for example, a hydrogen atom; a halogen atom such as fluorine, chlorine and bromine; an alkyl group such as a methyl group, an ethyl group, a propyl group, an isopropyl group, a butyl group, an isobutyl group, a hexyl group and a stearyl group; a cycloalkyl group such as a cyclohexyl group; an substituted or unsubstituted aromatic hydrocarbon group such as a phenyl group, a tolyl group, an ethylphenyl group, an isopropylphenyl group, a naphthyl group and an anthryl group; an aralkyl group in which an aryl group is substituted with a benzyl group, a phenethyl group, other alkyl groups. These may be each different or partially different, or all may be the same.

Specific examples of a case in which $R^9$ and $R^{10}$ or $R^{11}$ and $R^{12}$ together form a divalent hydrocarbon group can include, for example, an alkylidene group such as an ethylidene group, a propylidene group and an isopropylidene group.

In a case where $R^9$ or $R^{10}$ and $R^{11}$ or $R^{12}$ together form a ring, the ring formed may be a monocyclic or polycyclic ring, or may be a polycyclic ring having a cross-linking, or may be a ring having a double bond, or may be a ring comprising a combination of these rings. Further, these rings may have a substituent such as a methyl group.

Specific examples of a cyclic olefin component represented by the general formula (I) can include those similar to Japanese Patent Application Laid-Open No. 2007-302722.

These cyclic olefin components may be used alone, or may be used in a combination of two or more. Among these, bicyclo[2.2.1]hept-2-ene (trivial name: norbornene) is preferably used alone.

A copolymer of norbornene and ethylene is particularly preferred as a cyclic olefin resin. The ratio of norbornene and ethylene can be easily adjusted, and a Tg can be, in turn, easily adjusted by the ratio.

[Other Copolymerization Components]

In addition to [1] a α-olefin component having a carbon number of 2 to 20 and [2] a cyclic olefin component represented by the general formula (I) as described above, a cyclic olefin resin may contain another copolymerizable unsaturated monomer component, if desired, in a range where the object of the present invention is not compromised.

There is no particular limitation for methods of polymerizing [1] an α-olefin component having a carbon number of 2 to 20 and [2] a cyclic olefin component represented by the general formula (I) and methods of hydrogenizing the resulting polymer, and they can be performed in accordance with a known method. Further, it may be random copolymerization or block copolymerization, but random copolymerization is preferred. Note that for a specific polymerization form, any of solution polymerization, bulk polymerization and slurry polymerization can be used, and further, either continuous polymerization or batch polymerization may be used.

An example of a method of manufacturing a cyclic olefin resin will be described. A cyclic olefin resin may be manufactured by introducing a monomer composition comprising a cyclic olefin component and an α-olefin component into a reactor, and adding a polymerization catalyst and a polymerization solvent thereto, and allowing a predetermined reaction temperature and reaction pressure. A cyclic olefin resin is obtained in a state where it is included in a polymerization solvent. A cyclic olefin resin is obtained therefrom by removing the solvent under conditions of high temperature, reduced pressure and the like.

Note that a reaction temperature and reaction pressure can be appropriately selected so that the content ratio of a cyclic olefin component and an α-olefin component in a resin falls within a desired range. Further, in a case where an α-olefin component is a gas, a reaction pressure is unambiguously determined when the gas concentration (mol/L) of the α-olefin component is defined.

There is no particular limitation for a polymerization catalyst which can be used in manufacture of a cyclic olefin resin, and a conventionally known catalyst can be used such as a Ziegler-Natta based catalyst, a metathesis based catalyst, a metallocene based catalyst. These catalysts may be manufactured by a conventionally known method, or commercially available products may be used. An addition copolymer of a cyclic olefin component and an α-olefin component or a hydrogenated product thereof is preferably manufactured using a metallocene based catalyst.

Polymerization solvents can include, for example, aliphatic hydrocarbons such as hexane, heptane, octane and kerosene; alicyclic hydrocarbons such as cyclohexane, methylcyclohexane and decahydronaphthalene; aromatic hydrocarbons such as benzene, toluene and xylene; and the like. These hydrocarbon based solvents can be used alone or in a combination of two or more.

There is no particular limitation for the content of a cyclic olefin resin having a glass transition point (Tg) of 170° C. or more in a composition, but it is from 80 mass % to 99 mass % in a cyclic olefin resin composition, preferably from 90 mass % to 95 mass %. According to the present invention, a unique micro-domain structure having anisotropy in a plane is formed when molding a film, allowing high transparency characteristic of a cyclic olefin resin to be made use of. Therefore, the content of a cyclic olefin resin is preferably adjusted to the above content.

Styrene Based Elastomer

There is no particular limitation for styrene based elastomers as long as they contain a styrene unit as a copolymer unit, and a conventionally known substances can be used. Conventionally known styrene based elastomer resins include, but not limited to, for example, SIBS (styrene-isobutylene-styrene copolymer), SEBS (styrene-ethylene-butylene-styrene copolymer), SEPS (styrene-propylene-styrene copolymer), SEEPS (hydrogenated styrene-isoprene.butadiene-styrene copolymer) and the like.

The brittleness of a film can be improved by using a cyclic olefin resin composition comprising a styrene based elastomer as a raw material.

With regard to the content of styrene in a styrene based elastomer, a styrene based elastomer is selected in order to maintain transparency in which the difference in refractive index between a cyclic olefin resin is small, and specifically, in which the refractive index thereof is n2 so that $\Delta n=|n2-n1|$, which is an absolute value of $\Delta n$, is 0.012 or less, preferably 0.011 or less, and in particular preferably 0.010 or less when the cyclic olefin resin has a refractive index of n1. A $\Delta n$ of 0.012 or less is preferred because transparency, in particular an internal haze will be 1.0% or less.

The FIGURE shows a graph illustrating the change in the refractive index when the amount of styrene (mol %) in various styrene based elastomers is changed using a cyclic olefin resin (TOPAS 6017S-04; the refractive index is 1.533; labeled as COC in the FIGURE) as a reference. From the FIGURE, it is possible to understand that the refractive index can be adjusted to about 1.533 at about 31 mol % in a case where SIBS is used, and the refractive index can be adjusted to about 1.533 at about 51 mol % in a case where SEBS, SEPS, SEEPS are used in this example.

In order to precisely perform fine adjustment of the refractive index as described above, two or more styrene based elastomers are preferably included as the styrene based elastomers. This will be further described in Examples.

Note that in the present invention, also preferred is an aspect in which a styrene based elastomer having a melt index (MI) smaller than that of a cyclic olefin resin at 270° C. and at a load of 2.16 kg is at least included. When the viscosity ratio of a cyclic olefin resin and an elastomer is defined as (MI of elastomer)/(MI of cyclic olefin resin), the viscosity ratio is preferably 0.3 or less, more preferably 0.1 or less, and preferably 0.01 or more.

By including a styrene based elastomer having a small MI, the in-plane anisotropy of a micro-domain derived from the styrene based elastomer as described below will be small, allowing the folding resistance in the direction of TD/MD to be well balanced. Specifically, the TD/MD ratio (a ratio based on the number of times) as a result from folding tests according to a method described in Examples is 12 or less, preferably 10 or less.

Note that in a case where a styrene based elastomer having an MI smaller that of a cyclic olefin resin is included, a micro-domain, i.e., a dispersion diameter, will be large although the internal haze will be low. As a result, the unevenness of a film surface will be large, and the total haze tends to be increased. Therefore, in the present invention, a styrene based elastomer having an MI larger than that of a cyclic olefin resin is also preferably included.

In the present invention, a styrene based elastomer having an MI larger than that of a cyclic olefin resin is preferably further included. This can solve the problem of an increased total haze described above. When the viscosity ratio of a cyclic olefin resin and an elastomer is defined as (MI of elastomer)/(MI of cyclic olefin resin), the viscosity ratio is preferably 4.0 or less, and preferably 1.0 or more.

The blending ratio of a styrene based elastomer having a small MI and a styrene based elastomer having a large MI is preferably adjusted so that the viscosity ratio falls in a range from 0.3 to 4.0 when the ratio of the mean MI calculated by weighted-averaging a cyclic olefin resin and elastomers after blending is defined as (MI of elastomer)/(MI of cyclic olefin resin).

In this case, the mean MI of two or more styrene based elastomers may be calculated as follows. For example, in a case where three elastomers of Elastomers A, B and C are used, and their MI values are represented by $M_A$, $M_B$ and $M_C$, respectively; and in a case where the total amounts of A, B and C is taken as 1, and their ratios are represented by a, b and c, respectively, then May, the mean MI value, may be calculated as follows:

$$Mav=10exp(\log M_A *a+\log M_B *b+\log M_C *c)$$

The content of styrene based elastomers in total is from 1 mass % to 20 mass % in a cyclic olefin resin composition, preferably from 5 mass % to 10 mass %. This is more preferred because an effect of brittleness improvement is obtained in the case of 1 mass % or more, and the decrease in film transparency is small in the case of 20 mass % or less.

A cyclic olefin resin composition may contain conventionally known additives such as other resins, colorants, antioxidants, stabilizers, plasticizers, lubricants, parting agents and flame retardants in a range where the effects of the present invention are not compromised. The above composition may be melt-mixed beforehand into pellets.

Method of Manufacturing Cyclic Olefin Resin Composition

There is no particular limitation for methods of manufacturing the cyclic olefin resin composition according to the present invention. In general, a resin composition may be prepared by a facility and method known as those of preparing a resin composition.

For example, as a first example, a cyclic olefin resin composition pellet can be manufactured by adding a styrene based elastomer to a polymerization solution after solution polymerization (a cyclic olefin resin is included in the polymerization solvent) to give a polymerization solution containing a cyclic olefin resin and a styrene based elastomer, and then removing a polymerization solvent from this polymerization solution under conditions of a high temperature and a reduced pressure to give a mixture containing the cyclic olefin resin and the styrene based elastomer in a molten state, and then extruding this mixture, and cooling the resulting strand-shaped mixture by a known method, and cutting the strand-shaped mixture with a pelletizer and the like.

As a second example, a method may be used comprising adding a styrene based elastomer to a cyclic olefin resin in a molten state after removing a polymerization solvent from a polymerization solution. This method is similar to that of manufacturing a cyclic olefin resin composition pellet according to the first example except that the timing of adding a styrene based elastomer is different.

As a third example, a styrene based elastomer may be melt-kneaded and added to a cyclic olefin resin. Methods of performing melt-kneading can include, for example, those of performing melt-kneading with a uniaxial or biaxial screw extruder, a Banbury mixer, a roll, various kneaders and the like. Specifically, they are a method comprising kneading a cyclic olefin resin and a styrene based elastomer in batch; or in the case of two or more styrene based elastomers, a method comprising: first melt-kneading styrene based elastomers only for pelletization, and then melt-kneading this with a cyclic olefin resin; further, a method comprising side-feeding two or more melt-kneaded styrene based elastomers in a molten state without pelletizing to melt-knead a cyclic olefin resin, thereby manufacturing a cyclic olefin resin composition pellet; and the like.

[Method of Manufacturing Heat-Resistant Transparent Film]

The heat-resistant transparent film (hereinafter, also referred to as simply a film) according to the present invention may be formed into a film having a predetermined thickness, preferably a thickness of 30 to 150 μm by the T-die method or the calender method which are conventionally known. A cylinder temperature at the time of extrusion molding is at the glass transition point (Tg) of the cyclic olefin resin included in a cyclic olefin resin composition+170° C. or less, preferably (Tg)+150° C. or less, more preferably (Tg)+120° C. or less. A film with sufficiently high transparency can be obtained by adjusting conditions of a cylinder temperature in a specific range. Specifically, a cylinder temperature is preferably adjusted to from 280° C. to 320° C. This can sufficiently suppress deterioration of a cyclic olefin resin by heat, deterioration of a thermoplastic elastomer and deterioration of other components. By suppressing deterioration of these, the decrease in transparency of a film molded article can be suppressed, and the decrease in other physical properties can be suppressed.

Molding conditions other than the cylinder temperature are appropriately selected. Specifically, other molding conditions are determined, taking the following points into account. Other components such as a thermoplastic elastomer need to be finely dispersed into a cyclic olefin resin so that they do not significantly reduce the transparency of a molded article. In the case of melting components such as a thermoplastic elastomer, they are also dissolved when performing melt-kneading with a cyclic olefin resin, and molding conditions may be adjusted so that the viscosity of the cyclic olefin resin in a molten state approaches the viscosity of these components in a molten state. Further, in a case where non-melting components are included, conditions such as the rotation speed of screw may be appropriately selected so that they do not aggregate. In a case where the both types of components are included, other molding conditions are determined with taking each of them into account. Note that molding conditions for manufacturing a transparent molded article and methods of determining these molding conditions are within the common knowledge in the art, and in many cases, no problem will be encountered if other molding conditions are determined based on these conventional technologies.

Note that with regard to the glass transition point of a cyclic olefin resin, a value is used as measured under conditions of a temperature increase rate of 10° C./min. by the DSC method (the method described in JIS K7121). Further, in a case where two or more cyclic olefin resins are included in a cyclic olefin resin composition, the glass transition point of the main cyclic olefin resin component is used when determining the cylinder temperature conditions.

The film according to the present invention is a molded article which can be manufactured by the manufacturing method according to the present invention, comprising a cyclic olefin resin and a styrene based elastomer in the above predetermined range, and having high transparency with an internal haze value of 1.0% or less as measured in a PEG (polyethylene glycol) liquid for a test piece having a thickness of 100 μm in accordance with JIS K7136. This high transparency is obtained because styrene based elastomers form a micro-domain structure in the matrix of a cyclic olefin resin, and one micro-domain comprises two or more styrene based elastomers, and further the two or more styrene based elastomers are selected so that the refractive index of the micro-domain is to be the same as that of the cyclic olefin resin, leading to very small optical refraction and scattering from the micro-domain.

Note that the film according to the present invention has a difference in total haze values of 0.3% or less before and after an 1-hour treatment at 150° C. as measured for a test piece having a thickness of 100 μm in accordance with JIS-K7136. By this, a heat-resistant transparent film can be obtained which is durable for use under a thermal load of 150° C. or more without affecting the surface smoothness and optical properties of a molded article. The reason is because a cyclic olefin having a sufficiently high Tg for a thermal load is selected as the main component.

The brittleness of the film according to the present invention may be improved by adding the above styrene based elastomer, and characterized by showing different behaviors depending on the in-plane anisotropy of a micro-domain derived from the styrene based elastomer, i.e., the film drawing direction when film forming, the direction perpendicular to the film drawing direction when film forming. A dispersion state of a micro-domain shows a form in which the micro-domain is stretched in the film drawing direction. In folding tests described in Examples, the folding resistance when folded until creased along the film drawing direction, i.e., along the longitudinal direction of a micro-domain is higher than that when folded until creased along the direction perpendicular to that direction.

As described above, the film having very high transparency according to the present invention has high thermal resistance as well as improved brittleness such as folding resistance while maintaining high transparency originating from a cyclic olefin resin. For this reason, the film according to the present invention can be preferably used, for example, for optical applications, medical applications, packaging applications, applications in electric/electronic parts and applications in industrial/commercial parts. Among others, it can be preferably used for optical applications in which maintenance of transparency under high temperature environments is an important requirement.

EXAMPLES

Below, the present invention will be further described in detail with reference to Examples, but the present invention shall not be limited by these Examples.

A cyclic olefin resin and a styrene based elastomer(s) were prepared in compositions shown in Tables 1 to 3 (mass % in the total composition), and the compositions from Examples and Comparative Examples were pelletized with a 30 mmφ biaxial extruder (D/d=1.4, L/D=35), at a cylinder temperature of 300° C., an amount of extrusion of 15 kg/hr and a screw rotation speed of 200 rpm.

Cyclic olefin resin: COC, TOPAS Advanced Polymers, TOPAS 6017S-04, the refractive index: 1.533, the glass transition point (Tg): 178° C.

Styrene based elastomer A: SIBS, Kaneka Corporation, SIBSTAR073T

Styrene based elastomer B: SIBS, Kaneka Corporation, SIBSTAR104T

Styrene based elastomer C: SEBS, Kraton Performance Polymers Inc., Kraton A1536

Styrene based elastomer D: SEBS, Kraton Performance Polymers Inc., Kraton MD1537

Styrene based elastomer E: SEPS, Kuraray Co., Ltd., Septon 2007

Styrene based elastomer F: SEPS, Kuraray Co., Ltd., Septon 2104

Styrene based elastomer G: SEEPS, Kuraray Co., Ltd., Hybrar KL7350

Styrene based elastomer H: SEEPS, Kuraray Co., Ltd., Septon 4033

Styrene based elastomer I: SEBS, Kuraray Co., Ltd., Septon 8007

Styrene based elastomer J: SEBS, Kuraray Co., Ltd., Septon 8104

Styrene based elastomer K: SEBS, Kuraray Co., Ltd., Septon 8105

Next, the above pellets were each formed into a film having a thickness of 100 μm with a T-die type 35 mmφ film extruder (single flight, L/D=30) at a cylinder temperature of 310° C., at a die temperature of 300° C. and at an extrusion amount of 7 kg/hr.

Evaluation of Films

Evaluation was performed as follow for the above films. Measurement results were each shown in Tables 1 to 3.

[Total Haze]

The total haze was measured by the method in according to JIS K7136 using a haze meter (Toyo Seiki Seisaku-Sho Ltd., Product name: Haze Guard II).

[Internal Haze]

The internal haze was measured by the method in according to JIS K7136 using a haze meter (Toyo Seiki Seisaku-Sho Ltd., Product name: Haze Guard II). Specifically, in order to cancel out scattering on a film surface, measurements were performed while a test piece was immersed into a quartz cell which was filled with PEG. A value was shown which was obtained by subtracting the haze value of a PEG-filled quartz cell without a test piece immersed from the haze value of a PEG-filled quartz cell with a test piece immersed.

[Difference in Total Haze after Thermal Resistance Tests]

After a test piece was treated at a temperature of 150° C. for 1 hour, the above total haze values were measured to compute the increment of a haze value.

[Folding Tests (MIT Knead Fatigue Resistance Tests)]

The number of folding times until breakage of a film was evaluated by the method in accordance with JIS P8115 using a MIT knead fatigue resistance tester from Toyo Seiki Co., Ltd. For example, 0 means that it was broken at the first occasion of folding, and 1 means that it was not broken at the first occasion of folding, but was broken at the second occasion of folding. MD indicates that it was folded until creased along the direction perpendicular to the film drawing direction when film forming (the direction of folding corresponds to MD, and therefore, this is defined as the MD direction in the MIT tests in Examples), and TD indicates that it was folded until creased along the film drawing direction when film forming (the direction of folding corresponds to TD, and therefore, this is defined as the TD direction in the MIT tests in Examples).

[Melt Index (MI)]

MIs were measured under conditions of 270° C. and a load of 2.16 kg by the method in accordance with JIS K7210 using a melt indexer from Toyo Seiki Co., Ltd.

TABLE 1

| | Amount of styrene (mol %) | MI (270° C.) | MI ratio (Elastomer/ cyclic olefin resin) | Comparative Example 1 | Comparative Example 2 | Example 1 | Comparative Example 3 |
|---|---|---|---|---|---|---|---|
| Cyclic olefin resin | | 2.7 | | 100.0 | 95.0 | 95.0 | 95.0 |
| Styrene based elastomer A | 30.0 | 30.1 | 11.15 | | 5.0 | 1.5 | |
| Styrene based elastomer B | 33.5 | 1.6 | 0.59 | | | 3.5 | 5.0 |
| Mean amount of styrene (mol %) | | | | | 30.0 | 32.5 | 33.5 |
| Difference in refractive-index | | | | | 0.001 | 0.001 | 0.002 |
| Mean MI of elastomers | | | | | 30.1 | 3.9 | 1.6 |
| MI ratio (Mean of elastomers/ cyclic olefin resin) | | | | | 11.15 | 1.44 | 0.59 |
| Total haze (%) | | | | 0.1 | 1.5 | 1.2 | 1.4 |
| Internal haze (%) | | | | 0.0 | 1.5 | 1.0 | 1.1 |

TABLE 1-continued

|  | Amount of styrene (mol %) | MI (270° C.) | MI ratio (Elastomer/ cyclic olefin resin) | Comparative Example 1 | Comparative Example 2 | Example 1 | Comparative Example 3 |
|---|---|---|---|---|---|---|---|
| Difference in total haze before and after thermal resistance (%) |  |  |  | 0.0 | 0.1 | 0.0 | 0.0 |
| MIT (TD) |  |  |  | 0 | 0 | 1 | 3 |
| MIT (MD) |  |  |  | 0 | 20 | 31 | 30 |

TABLE 2

|  | Amount of styrene (mol %) | MI (270° C.) | MI ratio (Elastomer/ cyclic olefin resin) | Comparative Example 1 | Comparative Example 4 | Comparative Example 2 | Example 3 | Example 4 | Example 5 |
|---|---|---|---|---|---|---|---|---|---|
| Cyclic olefin resin |  | 2.7 |  | 100.0 | 95.0 | 95.0 | 95.0 | 95.0 | 95.0 |
| Styrene based elastomer C | 42.0 | 7.3 | 2.70 |  | 5.0 | 1.4 |  | 2.8 |  |
| Styrene based elastomer D | 60.0 | 9.1 | 3.37 |  |  | 3.6 | 5.0 | 7.2 | 10.0 |
| Mean amount of styrene (mol %) |  |  |  |  | 42.0 | 55.0 | 60.0 | 55.0 | 60.0 |
| Difference in refractive-index |  |  |  |  | 0.017 | 0.000 | 0.006 | 0.000 | 0.006 |
| Mean MI of elastomers |  |  |  |  | 7.3 | 8.6 | 9.1 | 8.6 | 9.1 |
| MI ratio (Mean of elastomers/ cyclic olefin resin) |  |  |  |  | 2.70 | 3.19 | 3.37 | 3.19 | 3.37 |
| Total haze (%) |  |  |  |  | 2.6 | 0.3 | 0.4 | 0.5 | 0.3 |
| Internal haze (%) |  |  |  | 0.0 | 2.1 | 0.3 | 0.4 | 0.4 | 0.3 |
| Difference in total haze before and after thermal resistance (%) |  |  |  | 0.0 | 0.1 | 0.0 | 0.0 | 0.1 | 0.1 |
| MIT (TD) |  |  |  | 0 | 3 | 3 | 1 | 13 | 10 |
| MIT (MD) |  |  |  | 0 | 54 | 41 | 35 | 129 | 117 |

TABLE 3

|  | Amount of styrene (mol %) | MI (270° C.) | MI ratio (Elastomer/ cyclic olefin resin) | Comparative Example 1 | Example 6 | Comparative Example 5 | Example 7 | Comparative Example 6 |
|---|---|---|---|---|---|---|---|---|
| Cyclic olefin resin |  | 2.7 |  | 100.0 | 95.0 | 95.0 | 95.0 | 95.0 |
| Styrene based elastomer E | 30.0 | 4.8 | 1.78 |  |  |  |  |  |
| Styrene based elastomer F | 65.0 | 1.2 | 0.44 |  |  |  |  |  |
| Styrene based elastomer G | 50.0 | 40.9 | 15.15 |  |  |  | 2.5 | 5.0 |
| Styrene based elastomer H | 30.0 | 1.0 | 0.37 |  | 1.2 | 5.0 |  |  |
| Styrene based elastomer I | 30.0 | 3.0 | 1.11 |  |  |  |  |  |
| Styrene based elastomer J | 60.0 | 0.1 | 0.04 |  |  |  |  |  |
| Styrene based elastomer K | 65.0 | 14.1 | 5.22 |  | 3.8 |  | 2.5 |  |
| Mean amount of styrene (mol %) |  |  |  |  | 56.3 | 30.0 | 57.5 | 50.0 |
| Difference in refractive-index |  |  |  |  | 0.006 | 0.025 | 0.006 | 0.004 |
| Mean MI of elastomers |  |  |  | 2.7 | 7.3 | 1.0 | 24.0 | 40.9 |
| MI ratio (Elastomer/cyclic olefin resin) |  |  |  |  | 2.70 | 0.37 | 8.89 | 15.15 |
| Total haze (%) |  |  |  | 0.1 | 0.3 | 37.4 | 0.1 | 1.3 |
| Internal haze (%) |  |  |  | 0.0 | 0.4 | 35.8 | 0.1 | 1.3 |
| Difference in total haze before and after thermal resistance (%) |  |  |  | 0.0 | 0.0 | 0.2 | 0.0 | 0.1 |
| MIT (TD) |  |  |  | 0 | 1 | 5 | 0 | 0 |
| MIT (MD) |  |  |  | 0 | 7 | 45 | 23 | 22 |

TABLE 3-continued

|  | Example 8 | Comparative Example 7 | Example 9 | Example 10 | Example 11 | Comparative Example 8 |
|---|---|---|---|---|---|---|
| Cyclic olefin resin | 90.0 | 90.0 | 90.0 | 90.0 | 90.0 | 90.0 |
| Styrene based elastomer E | 2.2 | | | | | |
| Styrene based elastomer F | 7.8 | 10.0 | | | | |
| Styrene based elastomer G | | | | | | |
| Styrene based elastomer H | | | | | | |
| Styrene based elastomer I | | | 0.8 | | 2.2 | |
| Styrene based elastomer J | | | 9.2 | 10.0 | | |
| Styrene based elastomer K | | | | | 7.8 | 10.0 |
| Mean amount of styrene (mol %) | 57.8 | 65.0 | 57.8 | 60.0 | 57.3 | 65.0 |
| Difference in refractive-index | 0.011 | 0.020 | 0.008 | 0.011 | 0.007 | 0.017 |
| Mean MI of elastomers | 1.6 | 1.2 | 0.1 | 0.1 | 10.0 | 14.1 |
| MI ratio (Elastomer/cyclic olefin resin) | 0.59 | 0.44 | 0.04 | 0.04 | 3.70 | 5.22 |
| Total haze (%) | 3.2 | 9.8 | 7.8 | 9.0 | 0.4 | 1.9 |
| Internal haze (%) | 0.7 | 2.5 | 0.7 | 0.9 | 0.2 | 1.4 |
| Difference in total haze before and after thermal resistance (%) | 0.1 | 0.2 | 0.2 | 0.2 | 0.1 | 0.0 |
| MIT (TD) | 5 | 15 | 32 | 24 | 3 | 2 |
| MIT (MD) | 69 | 26 | 58 | 58 | 44 | 12 |

TABLE 4

|  | Amount of styrene (mol %) | MI (270° C.) | MI ratio (Elastomer/cyclic olefin resin) | Example 12 | Example 13 | Example 14 | Example 15 | Example 10 | Example 16 |
|---|---|---|---|---|---|---|---|---|---|
| Cyclic olefin resin | | 2.7 | | 90.0 | 90.0 | 90.0 | 90.0 | 90.0 | 90.0 |
| Styrene based elastomer G | 50.0 | 40.9 | 15.15 | | | | | | 3.0 |
| Styrene based elastomer J | 60.0 | 0.1 | 0.04 | | 0.5 | 1.0 | 5.5 | 10.0 | 1.9 |
| Styrene based elastomer D | 60.0 | 9.1 | 3.37 | 10.0 | 9.5 | 9.0 | 4.5 | | 5.1 |
| Mean amount of styrene (mol %) | | | | 60.0 | 60.0 | 60.0 | 60.0 | 60.0 | 57.0 |
| Difference in refractive-index | | | | 0.006 | 0.006 | 0.006 | 0.008 | 0.011 | 0.004 |
| Mean MI of elastomers | | | | 9.1 | 7.3 | 5.8 | 0.8 | 0.1 | 6.1 |
| MI ratio (Mean of elastomers/cyclic olefin resin) | | | | 3.37 | 2.69 | 2.15 | 0.28 | 0.04 | 2.25 |
| Total haze (%) | | | | 0.3 | 0.4 | 0.4 | 3.3 | 9.0 | 0.3 |
| Internal haze (%) | | | | 0.3 | 0.3 | 0.3 | 1.0 | 0.9 | 0.2 |
| Difference in total haze before and after thermal resistance (%) | | | | 0.1 | 0.1 | 0.0 | 0.1 | 0.2 | 0.1 |
| MIT (MD) | | | | 10 | 10 | 12 | 20 | 24 | 12 |
| MIT (TD) | | | | 117 | 139 | 120 | 69 | 58 | 164 |

The results shown in Tables 1 to 4 demonstrate that the films according to the present invention have an internal haze of 1% or less, showing superior transparency. Further, transparency remains excellent even after the thermal resistance test at 150° C. Moreover, the results from the folding resistance tests are good, in particular good in the MD direction, which can be understood as improvement of brittleness.

The invention claimed is:

1. A transparent film, comprising a cyclic olefin resin having a refractive index of n1 and a glass transition point (Tg) of 170° C. or more, and at least one styrene based elastomer having a refractive index of n2 so that $\Delta n = |n2 - n1|$ is 0.012 or less,
wherein an internal haze value of a test piece having a thickness of 100 μm is 1.0% or less as measured in a polyethylene glycol liquid in accordance with JIS K7136,
wherein the transparent film comprises said at least one styrene based elastomer having a melt index (MI) at 270° C. and at a load of 2.16 kg smaller than that of the cyclic olefin resin at 270° C. and at a load of 2.16 kg, and
wherein the transparent film further comprises at least one styrene-based elastomer having a MI at 270° C. and at a load of 2.16 kg larger than that of the cyclic olefin resin.

* * * * *